Figure 1:
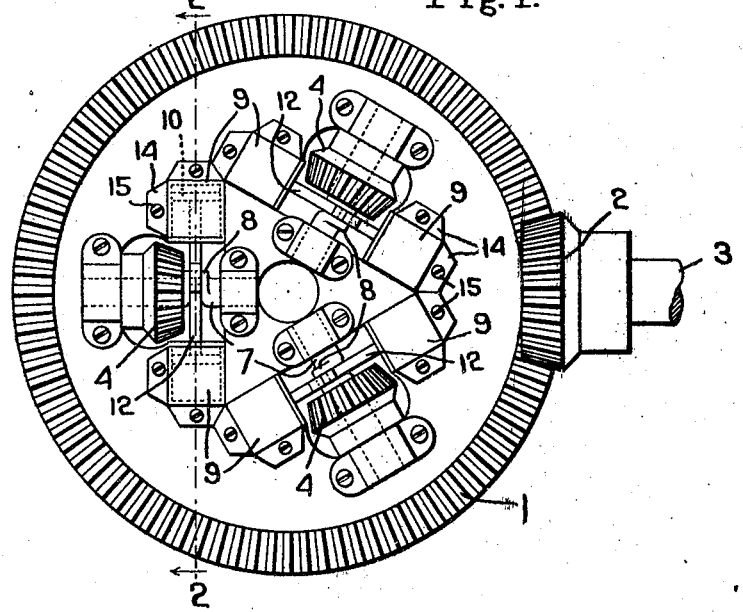

Jan. 1, 1924.

W. J. SMITH

DIFFERENTIAL GEARING

Filed Feb. 6, 1922

1,479,752

Inventor:
William J. Smith
by Heard Smith & Tennant
Attys

Patented Jan. 1, 1924.

1,479,752

UNITED STATES PATENT OFFICE.

WILLIAM J. SMITH, OF DORCHESTER, MASSACHUSETTS.

DIFFERENTIAL GEARING.

Application filed February 6, 1922. Serial No. 534,446.

*To all whom it may concern:*

Be it known that I, WILLIAM J. SMITH, a citizen of the United States, and resident of Dorchester, county of Suffolk, State of Massachusetts, have invented an Improvement in Differential Gearing, of which the following description, in connection with the accompanying drawing, is a specification, like characters on the drawing representing like parts.

This invention relates to differential gearing and especially to differential gearing such as is used in the rear end of automobiles.

The object of the invention is to provide an improved construction for applying a retarding action to the relative movement of the intermediate bevel gears so as to eliminate danger of one of the rear wheels of the automobile spinning while the other rear wheel remains stationary.

In order to give an understanding of the invention I have illustrated in the drawings a selected embodiment thereof which will now be described after which the novel features will be pointed out in the appended claim.

In the drawings, Fig. 1 is a view of a differential gearing embodying my invention.

Figure 2:
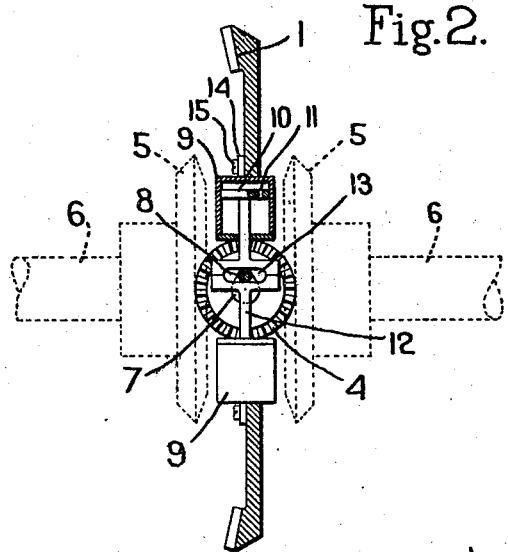

Fig. 2 is a section on substantially the line 2—2, Fig. 1.

The differential gearing herein shown is of that familiar type comprising a ring gear 1 which meshes with and is driven by a driving gear 2 on the driving shaft 3, and which has journalled therein a plurality of side bevel gears 4 that mesh with the two intermediate gears 5 fast on the two rear axle sections 6.

My present invention relates to an improved means for applying a retarding action to the rotation of the side bevel gears 4 and I propose to accomplish this by connecting one or more of the gears with a piston operating in a cylinder, said piston and cylinder operating in the manner of a dash pot.

In the construction herein shown each of the side bevel gears 4 is fast on a shaft 7 which is journalled in bearing in the ring gear 1 and which is provided with the crank portion 8. Associated with each side bevel gear 4 is one or more cylinders 9, there being two cylinders for each side bevel gear in the present embodiment of the invention. Each cylinder 9 has a piston 10 therein which is connected to the crank portion 8 of the corresponding shaft 7 so that the rotation of the side bevel will give a reciprocating motion to the corresponding piston.

Each cylinder 9 will preferably be filled with oil or some other liquid and a leak port is provided around the piston 10 so as to permit the piston to reciprocate while retarding its speed of reciprocation. One convenient way of accomplishing this is to provide each piston with a port 11 through which the liquid may pass as the piston moves from one end to the other of the cylinder. Where there are two cylinders and two pistons for each side bevel gear I may, if desired, connect the two pistons together by a rod 12 having a transverse slot 13 therein in which the crank 8 operates. The cylinders may be secured to the bevel gear in any suitable way. I have herein shown each cylinder as having a flange 14 thereon which overlies the face of the bevel gear and is secured thereto by screws or bolts 15.

The operation of the device will be readily understood from the foregoing. So long as the automobile is moving straight ahead the side bevel gears 4 will have no rotative movement about their own axis. If, however, one rear wheel and its axle section 6 rotates faster than the other rear wheel and its axle section then the side bevel gears will be given a turning movement, which turning movement will be retarded by the action of the pistons in the cylinders.

The construction is such as to permit the pistons to move slowly so that the operations of the device will not interfere in any way with the turning of the automobile around an ordinary corner, but if for any reason one rear wheel begins to spin while the other is stationary, the retarding effect of the pistons in the cylinder will prevent the side bevel gears 4 from rotating rapidly and will thus substantially prevent the spinning operation by causing the power to be applied to both rear wheels.

While I have herein illustrated a selected embodiment of the invention I do not wish to be limited to the constructional features shown.

I claim.

In a differential gearing, the combination with a ring bevel gear, of a driving pinion therefor, a plurality of side bevel gears rotatably mounted on the ring gear, a cylinder containing liquid associated with one of said bevel gears, and a ported piston in said cylinder connected to the bevel gear.

In testimony whereof, I have signed my name to this specification.

WILLIAM J. SMITH